US010904229B2

(12) United States Patent
Chen

(10) Patent No.: US 10,904,229 B2
(45) Date of Patent: *Jan. 26, 2021

(54) CACHING CONTENT SECURELY WITHIN AN EDGE ENVIRONMENT, WITH PRE-POSITIONING

(71) Applicant: Akamai Technologies, Inc., Cambridge, MA (US)

(72) Inventor: Tong Chen, Brookline, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/392,568

(22) Filed: Dec. 28, 2016

(65) Prior Publication Data

US 2017/0244682 A1 Aug. 24, 2017

Related U.S. Application Data

(60) Provisional application No. 62/272,108, filed on Dec. 29, 2015.

(51) Int. Cl.
*H04L 29/06* (2006.01)
*H04L 29/08* (2006.01)
(Continued)

(52) U.S. Cl.
CPC .......... *H04L 63/0485* (2013.01); *G06F 21/64* (2013.01); *H04L 9/3242* (2013.01);
(Continued)

(58) Field of Classification Search
CPC ............... H04L 63/0428; H04L 63/061; H04L 63/0442; H04L 63/045; H04L 63/123;
(Continued)

(56) References Cited

U.S. PATENT DOCUMENTS 7,010,578 B1    3/2006 Lewin et al.
8,601,256 B2   12/2013 Baentsch et al.
(Continued)

OTHER PUBLICATIONS

Hash then Encrypt, downloaded on Dec. 31, 2015, available Oct. 2015, 1 page.
(Continued)

*Primary Examiner* — Alexander Lagor
*Assistant Examiner* — Howard H. Louie
(74) *Attorney, Agent, or Firm* — David H. Judson

(57) ABSTRACT

A technique to cache content securely within edge network environments, even within portions of that network that might be considered less secure than what a customer desires, while still providing the acceleration and off-loading benefits of the edge network. The approach ensures that customer confidential data (whether content, keys, etc.) are not exposed either in transit or at rest. In this approach, only encrypted copies of the customer's content objects are maintained within the portion of the edge network, but without any need to manage the encryption keys. To take full advantage of the secure content caching technique, preferably the encrypted content (or portions thereof) are pre-positioned within the edge network portion to improve performance of secure content delivery from the environment.

11 Claims, 5 Drawing Sheets

(51) Int. Cl.
*H04L 9/32* (2006.01)
*G06F 21/64* (2013.01)

(52) U.S. Cl.
CPC .......... *H04L 63/0428* (2013.01); *H04L 67/02* (2013.01); *H04L 67/1097* (2013.01); *H04L 67/26* (2013.01); *H04L 67/2842* (2013.01); *H04L 67/42* (2013.01); *H04L 63/123* (2013.01); *H04L 63/166* (2013.01)

(58) Field of Classification Search
CPC . H04L 9/3247; H04L 63/0485; H04L 9/3242; H04L 67/02; H04L 67/1097; H04L 67/26; H04L 67/2842; H04L 67/42; H04L 63/166; H04L 9/0827; H04L 9/0891; H04L 29/08; H04L 29/06; H04L 9/03; G06F 21/64
See application file for complete search history.

(56) References Cited

U.S. PATENT DOCUMENTS

| | | | | |
|---|---|---|---|---|
| 8,819,451 | B2* | 8/2014 | Lokam | G06F 17/30675 713/193 |
| 9,137,218 | B2* | 9/2015 | Gero | H04L 9/0891 |
| 2002/0010798 | A1* | 1/2002 | Ben-Shaul | G06F 17/3089 709/247 |
| 2002/0112152 | A1 | 8/2002 | VanHeyningen et al. | |
| 2004/0006694 | A1* | 1/2004 | Heelan | G08B 27/005 713/168 |
| 2004/0093419 | A1* | 5/2004 | Weihl | H04L 63/06 709/229 |
| 2010/0250772 | A1* | 9/2010 | Mao | H04N 21/222 709/231 |
| 2011/0004607 | A1* | 1/2011 | Lokam | G06F 17/30675 707/759 |
| 2011/0125528 | A1* | 5/2011 | Padate | G06Q 50/24 705/3 |
| 2012/0117240 | A1* | 5/2012 | Omar | H04L 29/06 709/226 |
| 2013/0041972 | A1* | 2/2013 | Field | H04L 29/08729 709/213 |
| 2013/0156189 | A1 | 6/2013 | Gero et al. | |
| 2018/0063275 | A1* | 3/2018 | Kolhi | H04L 63/0428 |

OTHER PUBLICATIONS

Should we MAC-then-encrypt or encrypt-then-MAC?, downloaded on Dec. 31, 2015, 5 pages.

Gutmann, P., Encrypt-then-MAC for Transport Layer Security (TLS) and Datagram Transport Layer Security (DTLS), Sep. 2014, 7 pages.

* cited by examiner

CACHING CONTENT SECURELY WITHIN AN EDGE ENVIRONMENT, WITH PRE-POSITIONING

BACKGROUND

Technical Field

This application relates generally to secure network-based communications using cryptographic protocols such as Transport Layer Security (TLS).

Brief Description of the Related Art

Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

For a traditional RSA-based TLS session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the TLS server's publicly available RSA key. This generates an encrypted pre-master secret (ePMS), which is then provided to the TLS server. The TLS server has a private decryption key, which is then used to decrypt the encrypted pre-master secret. At this point, both the client and the server have the original pre-master secret and can use it to generate the symmetric key used for actual encrypted and secure data exchange. Decrypting the encrypted pre-master secret is the only time in the TLS connection that the private key is needed. This decryption occurs at a so-called TLS termination point. Where a CDN is used to facilitate delivery of secure content, typically the TLS termination point will be located in the CDN.

Some CDN customers are not comfortable sharing their private TLS (RSA, DSA, etc.) keys with the CDN service provider. Further, some customers may require an additional caveat that certain data and requests never be decrypted by the CDN at any point in any transaction, and that the data transmitted by the CDN on behalf of the customer is provably and verifiably authentic.

BRIEF SUMMARY

This disclosure describes a technique to cache content securely within edge network environments, even within portions of that network that might be considered less secure than what a customer desires, while still providing the acceleration and off-loading benefits of the edge network. The approach ensures that customer confidential data (whether content, keys, etc.) are not exposed either in transit or at rest. In this approach, only encrypted copies of the customer's content objects are maintained within the portion of the edge network, but without any need to manage the encryption keys. According to another aspect, and to take full advantage of the secure content caching technique, preferably at least some encrypted content is pre-positioned within the edge network portion to improve performance of secure content delivery from the environment.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DESCRIPTION

Figure 1:
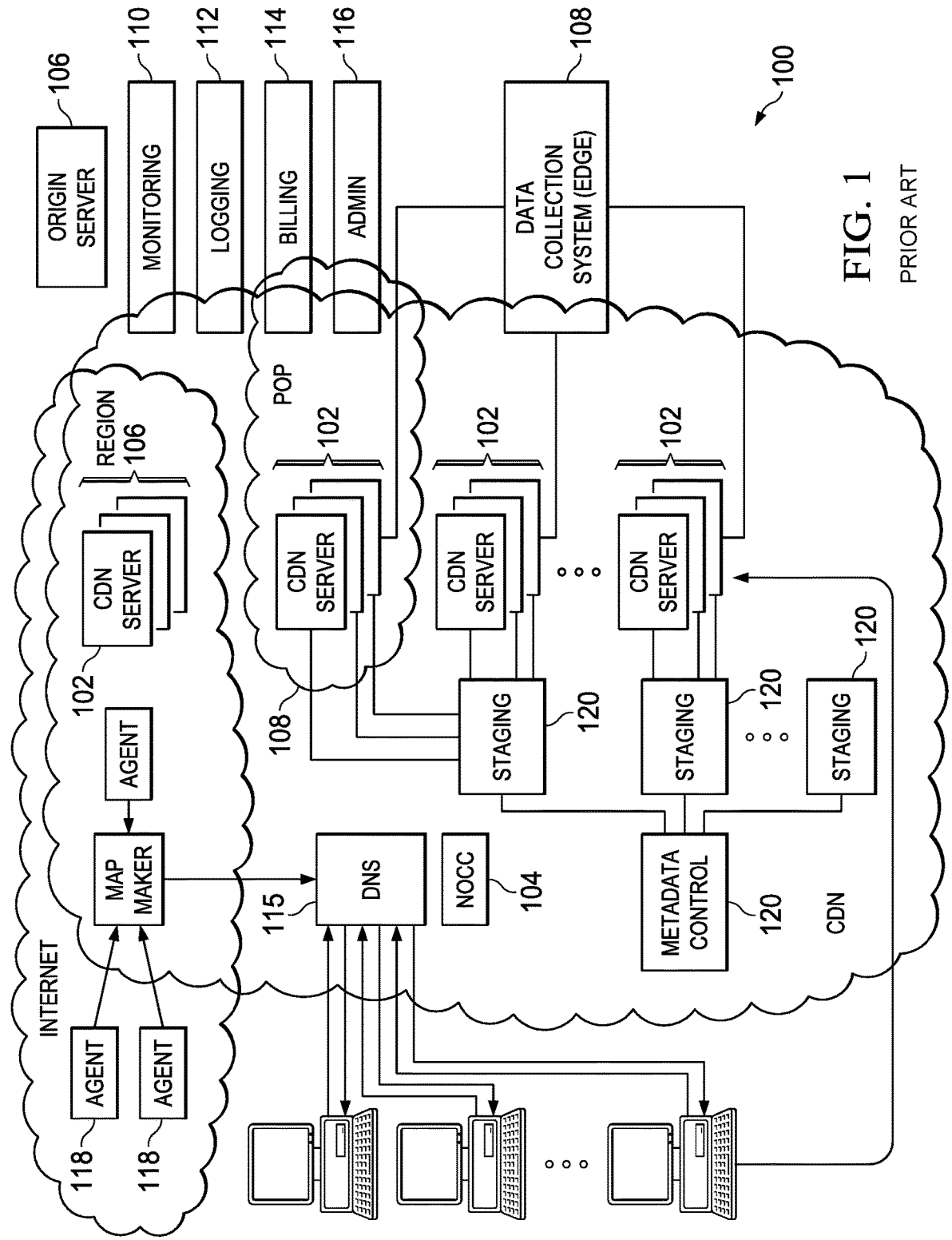
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
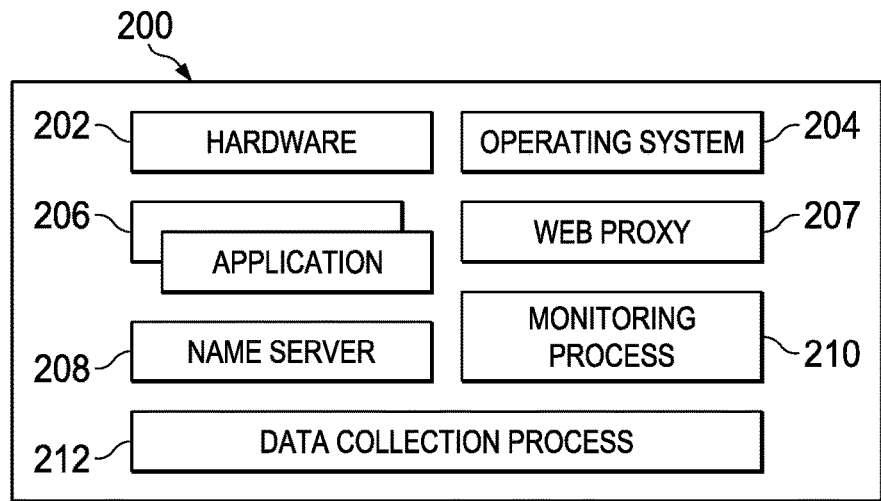
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

Content Delivery Network with TLS Support

As used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not necessarily have the customer's private key or the customer's certificate.

Figure 3:
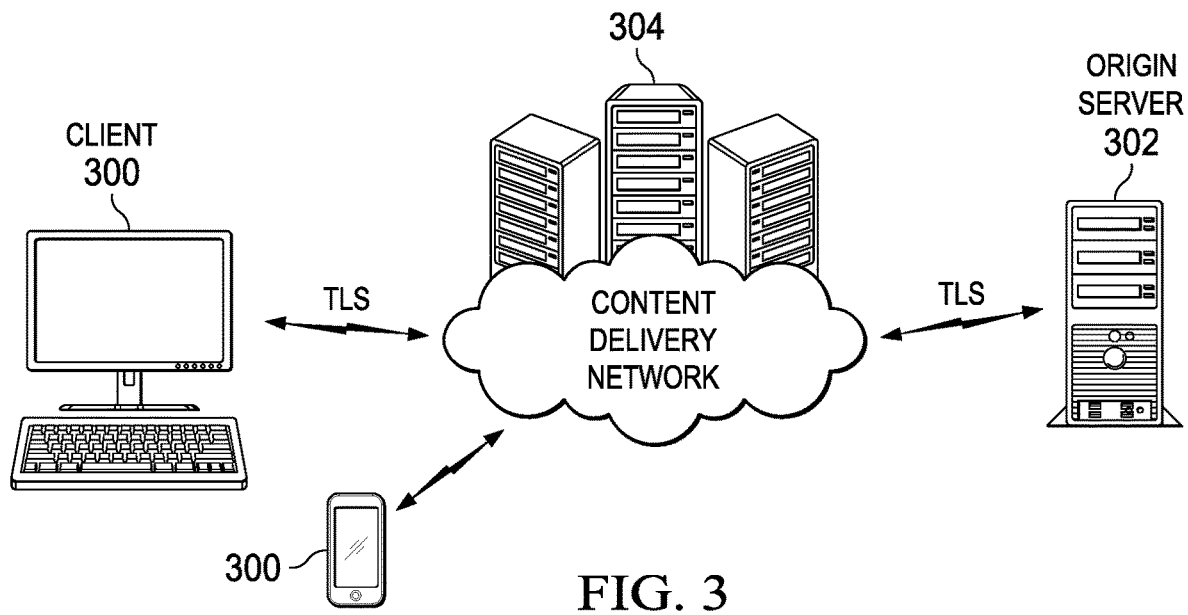
FIG. 3 is a representative active TLS session among a client, an edge server, and an origin server.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

The following provides details regarding the TLS handshake between the client 300 and the origin 302. The reader's familiarity with the TLS Specification is presumed. The edge machine server instance 304 passes handshake messages through directly to the origin 302, and vice versa. Once the handshake is complete, the origin 302 and client 300 will have negotiated a Pre-Master Secret and exchange random number values for the session. According to the TLS 1.2 Specification Section 8.1, each side will have converted its Pre-Master Secret into a Master Secret using an agreed-upon pseudo-random function (PRF), such as an HMAC variant. The TLS 1.2 Specification Section 6.3 notes that this Master Secret is then converted into a larger key block, which is then used to calculate the following TLS items: client_write_MAC_key (the key that be used as input to the client's sent data message authentication codes (MACs)), wherein each TLSCipherText record has a MAC that verifies the data in the record is authentic and unchanged); server_write_MAC_key (the key that will be used as input to the server's sent data MACs); client_write_key (the key that will be used for the agreed-upon bulk encryption cipher for client sent data; and server_write_key (the key that will be used for the agreed-upon bulk encryption cipher for server sent data). Other items may be calculated but, for purposes of this protocol, are not relevant.

The following provides details regarding the handling of encrypted requests and responses in this known approach. The requests are encrypted using the parameters from the TLS handshake described above. In a typical operation, the CDN edge server 304 receives the TLS records (that represent the request) from the client 300 and simply forwards them along to the origin 302, unable to read them due to the encryption. When the response data (from the origin) is private and should not be shared with the CDN, the origin 300 responds back to the edge server 304 using the conventional TLS mechanisms. The edge server 304 receives this data and simply passes it through to the client 300, again unable to read it due to the encryption. In other words, the edge server 304 is simply acting as a pass-through TCP proxy. It can neither decrypt data nor contribute data to the TLS session.

Figure 4:
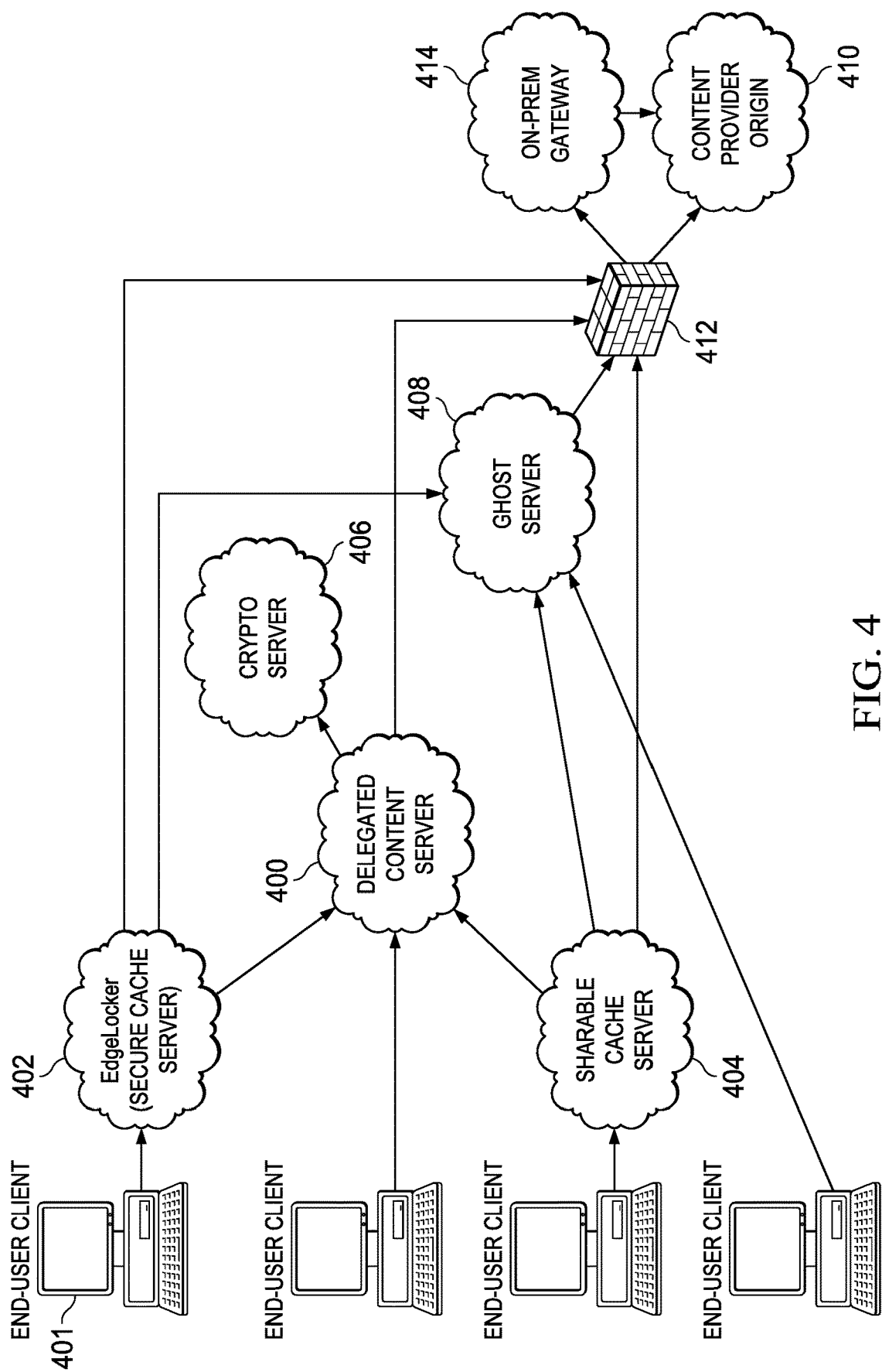
FIG. 4 depicts a multi-layered edge network in which the subject matter of this disclosure may be implemented.

FIG. 4 depicts a multi-layered operating environment in which the subject matter of this disclosure may be implemented. A first layer comprises two (2) types of servers, namely, secure cache servers 402, and shareable cache servers 404. As will be described in more detail below, the "secure cache servers" 402 are used to facilitate certain techniques of this disclosure. A secure cache server 402 is sometimes referred to herein as "EdgeLocker," although this nomenclature is not intended to be limiting.

A second layer comprises two (2) additional types of servers, namely, delegated content servers 406, and ghost servers 408.

Although the delegated content server 406 is shown as distinct from the ghost server 408, this is not a requirement, as a ghost server may operate in the role of the delegated content server (as will be described below by way of example).

A third layer comprises on-premises gateways or gateway servers 410, which are typically located behind a corporate (CDN customer) firewall 412. As further depicted, it is presumed that end user client machines 401 desire to interact with the content provider origin 403. As also depicted, a crypto-server machine (or set of machines) 414 may be used to maintain private keys for TLS session establishment. The crypto-server and its operation within the context of a typical TLS-based implementation is described in U.S. Publication No. US2015/0067338.

The various servers may operate within the context of different security models, each providing a different level of key exposure. Thus, for example, the ghost servers 408 may operate in secure physical environments (e.g., with appliances located in secure monitored cages), and host customer private keys. The delegated content servers 406 may operate with or outside of such secure physical environment but are presumed to at least host TLS session keys (these servers would then interact with the crypto server 414 for TLS termination). The shareable cache servers typically store un-encrypted data that are later validated and encrypted when serving to the end user client machines 401. This un-encrypted data can be shared among different TLS sessions, thus improving cache efficiency. A shareable cache server 404 may interact with a delegated content server 406 (or some other CDN provider-managed server) using the TLS splicing approach described in U.S. Pat. No. 9,137,218; in such circumstances, the key exposure is limited to the server write encryption key.

According to this disclosure, and as will be described below, preferably the secure cache server (the EdgeLocker) has no keys; thus, it has no key exposure per se.

Preferably, the servers 402 and 404 in the first layer provide data caching, operating on TLS records, and preferably they not perform any HTTP request processing. Instead, servers—such as the EdgeLockers 402—preferably rely on servers in other layers for the HTTP requests processing, and they take instructions from those other servers. The second layer of servers, in contrast, preferably handle the HTTP request processing, including the standard HTTP response caching. They can be used to serve end user clients directly and, as will be seen, they also can be used to assist the EdgeLockers to serve the requests (in accordance with this disclosure). Ghost servers typically are entrusted to be a full proxy of the content provider origin.

As noted above, typically the on-premises gateways are not part of the physical "edge" but, rather, are located behind a customer firewall. These servers are desirable in certain use cases. For customers that do not want their private keys anywhere outside of their firewalls, however, the gateways may also provide the crypto-server function. For customers that do not want any content cached un-encrypted anywhere (except behind the firewall), the gateways may also act as content servers for the secure cache servers 402.

Figure 5:
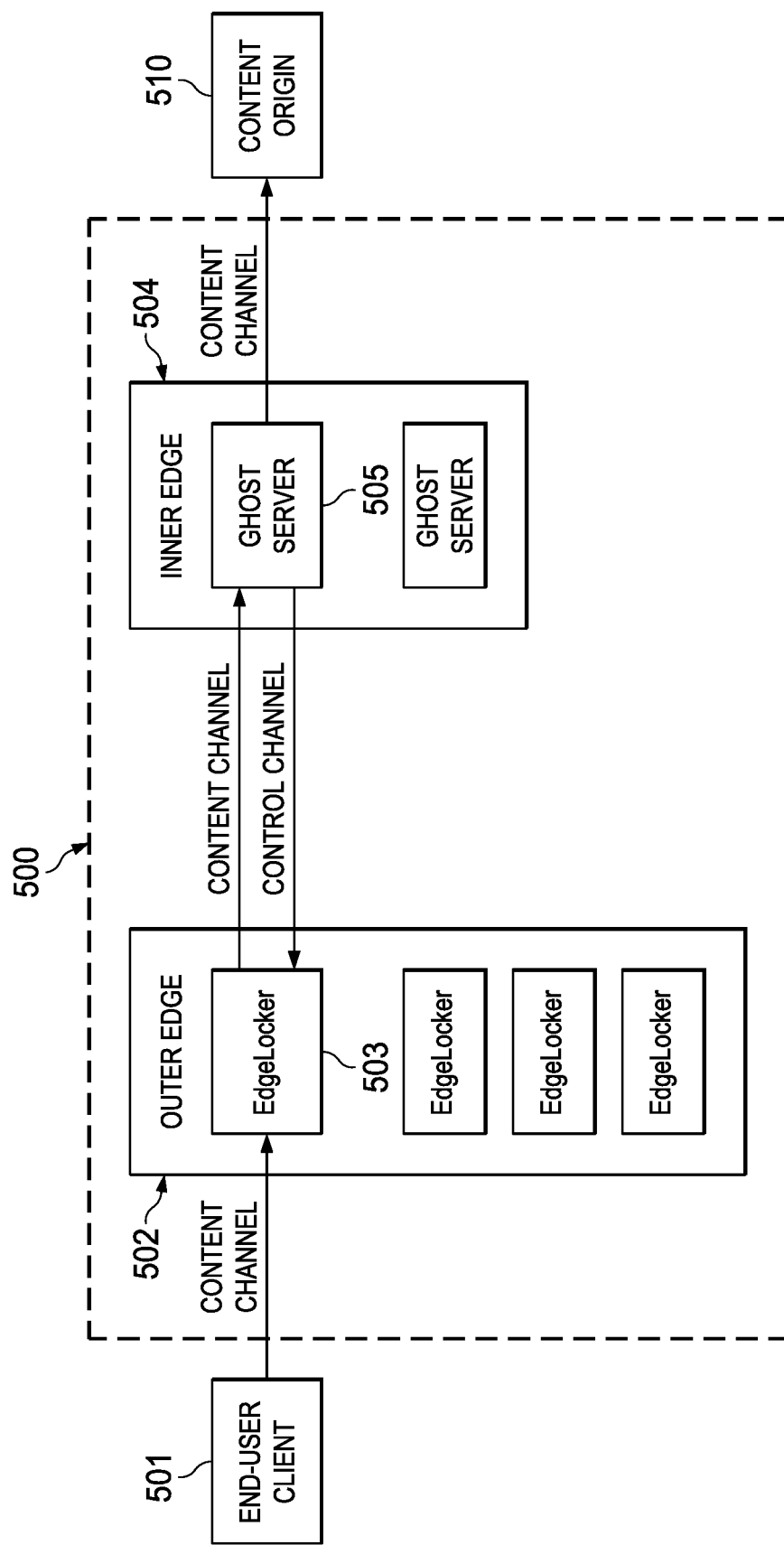
FIG. 5 depicts how an EdgeLocker acts as an intermediary between a requesting end user client machine and an upstream edge server global host (ghost) process according to this disclosure.

Caching and Pre-Populating Content Securely within a Multi-Layered Edge Environment FIG. 5 depicts a preferred implementation of the techniques of this disclosure.

Within the context of this disclosure, and relative to the ghost server (or the second layer generally), the EdgeLocker is considered to be located within a portion of the edge network that is considered to be "further" away. There may be one or more reasons (or use cases) for this, e.g., the EdgeLocker may be deeply deployed (or, at least, more deeply deployed relative to a ghost server) within an end user network such that it is closer to the requesting end users than, say, are the ghost servers. In this context, the EdgeLocker is sometimes referred to as located within an "outer edge" wherein the ghost server is located within an "inner edge." The terms "outer" and "inner" as used herein are not necessarily meant to imply some actual physical notion (although they may), but rather a difference in the sensitivity of those network elements (e.g., to key exposure, or even content exposure). As such, the EdgeLocker is considered to be more sensitive to key and content exposure that, say, the ghost servers or other servers in the CDN.

According to this disclosure, EdgeLocker preferably keeps only encrypted copies of the objects in the network, but without the need to manage the encryption keys. The solution leverages the bulk encryption already done by the TLS layer and caches the encrypted TLS segments in the network. Because end-user clients already have the bulk encryption keys, however, no additional key management is needed in this approach.

As depicted in FIG. 5, a multi-layered edge network 500 comprises a more secure inner edge 504, and a relatively less secure outer edge 502. The inner edge runs ghost servers 505, preferably operating a full-stack that handles the TLS termination and the HTTP requests; in contrast, the outer edge preferably operates at the transport layer providing DDoS protection, data caching and serving the cached data. The EdgeLockers 503 run in the outer edge. The outer edge 502 caches the TLS encrypted fragments, if needed, as instructed by the inner edge 504. Preferably, the inner edge also coordinates with the outer edge to ensure the communication with the end-user clients conforms to the protocol standards.

As noted above, there are several use cases for the solution. These include an extension to a CDN secure delivery service to improve capacity (and likely performance) for "secure-grade" delivery without racking up the cost of managing additional secure edge regions. In this context, the extension acts as the outer edge to provide increased geo-footprint, DDoS protection capacity and off-loading. Another use case is the on-premises behind-the-firewall gateways for customers desiring to control all of their web resources without having any un-encrypted data on the content delivery network. In this context, the gateways act as the inner edge to the Edge Lockers. Another use case is for carrier network deployments, which can also provide the outer edge for secure content delivery.

As depicted in FIG. 5, the multi-layer edge network 500 is used for serving secure traffic. The end-user clients 501 make requests in a conventional manner. The EdgeLockers 503 in the outer edge 502 work with the ghost servers 505 in the inner edge 504 to serve the requests. Preferably, and as depicted, the ghost servers 505 maintain persistent control channels 506 with the EdgeLockers 503 to coordinate the data caching and serving of the cached data.

The following is a representative workflow description. It is assumed that other CDN functions (e.g., DNS region/server selection) are implemented to identify the particular EdgeLocker instance and ghost server that are involved in the communication. These are well-known CDN functions, such as described in U.S. Pat. No. 6,108,703.

Each of the EdgeLocker and the ghost server are implemented as one or more software processes or programs executed in one or more hardware processors. An Edge-Locker may be implemented in a standalone machine, e.g., a rack-based appliance. An EdgeLocker "instance" executes in a machine that typically is distinct from a "ghost server" instance that executes in a different machine.

TLS Session Establishment and Request Processing

1. End-user client makes a request for a TLS session, either a new one or a resumed one, to the EdgeLocker.

2. The EdgeLocker checks the request packets against a set of rules to ensure the request is unlikely to be an attack. Such rules could include pre-configured firewall rules, client reputation rules, TLS session negotiation rate limiting rules, and etc.

3. If the request is valid, it is forwarded to the ghost server.

4. The ghost server goes through the TLS session negotiation process with the end-user client, with the EdgeLocker forwarding the packets. Because the EdgeLocker has no knowledge of any private keys, it does not obtain any session keys. However, the EdgeLocker could examine the packets to ensure the TLS state changes are valid to protect against attacks on the TLS negotiation process.

5. During the TLS session negotiation, the ghost server checks if the client supports encrypt-then-mac (per the RFC7366 standard), and saves it for the later HTTP request processing. If the client does not have the RFC7366-compliant support, the requests are processed in a conventional manner (as the ghost server normally would). Otherwise, the requests are processed as described in the paragraphs below.

6. After the TLS session is established, the end-user client sends the HTTP request, over the TLS session.

7. The EdgeLocker again forwards the packets to the ghost server.

8. The ghost server processes the request, preferably using a standard ghost server HTTP processing pipeline. The request either could be served from the ghost server cache, or by forwarding to the cache parent, the origin, or the like, all as well-known.

Non-Cacheable Response Handling

1. If the response is non-cacheable, the ghost server just sends the response.

2. The EdgeLocker forwards the response to the end-user client.

Cacheable Response Handling

1. If the response is cacheable, the ghost server communicates the fact to the EdgeLocker and expects a response from the EdgeLocker with the information on data it cached for the object.

2. If the EdgeLocker does not have the data cached, the ghost server sends the response.

3. The EdgeLocker stores the response and then forwards it on to the requesting end user client.

4. If the EdgeLocker has the data, the ghost server still generates the TLS records, but without sending them. Instead, the ghost server sends the updated information on the TLS records through the control channel to the Edge-Locker. The updated information has a much smaller size than the TLS records themselves.

5. The EdgeLocker uses that information, along with its cached data for the object, to construct the TLS records, and it sends the TLS records to the end-user client.

Control Channel Interface Description

The ghost server and EdgeLocker preferably communicate over the control channel to coordinate the processing. The interactions preferably are initiated from the ghost server, even though the connections are established from the EdgeLocker, preferably during its start up. In this manner, the EdgeLocker is much more lightweight than the ghost server.

A preferred wire protocol uses the Google protobuf. One format of the messages is described below.

Request Number:

Each request message includes a request number that is also included in the response, to correlate the request and response.

Cache Data Query Message:

The message from the ghost server querying the cached data preferably includes the following fields:

sessionid: the id uniquely identifies the set of session keys. Note that the sessionid also captures the "version" of the bulk encryption keys, in addition to the TLS session identifier.

docid: an id uniquely identifies the HTTP object being served. Note that the docid also captures the "version" of the object.

In response, the message from the EdgeLocker preferably includes the following fields:

ack: 1 if it has the data in cache, 2 otherwise, or other error codes.

Cache Data Update Message:

The message from the ghost server updating the cached data preferably includes the following fields:

sessionid: the id uniquely identifies the set of session keys.

docid: an id uniquely identifies the HTTP object being served.

recs: list of data on the TLS records, where each entry includes the following seqnum: the new sequence number of the TLS record.

hash: the HMAC value.

In response, the message from the EdgeLocker preferably includes the following fields:

ack: 1 for success or the error code otherwise.

Preferably, the control channel is a regular TLS connection. In addition, link between the ghost server and the EdgeLocker is semi-private, network-layer protection can also be enforced.

As a skilled person will appreciate, and because the data are encrypted with the TLS session bulk encryption key, the cached data is only valid for the duration of the session. This is likely less efficient than if the plain text objects were to be cached. Therefore, if the use case allows the caching of plain text objects, the above-described mechanism may be by-passed (at least with respect to those objects). Other use cases, such as the REST API services (where the requests come from other web applications) may have long-standing sessions and thus use the approach.

Of course, with multiple end-user clients using different TLS sessions, multiple encrypted copies need to be stored at the edge, even for the same plain text object. Even so, the technique herein provides benefits, at least in part because the content to be served are cached at the edge. Keeping multiple copies of an object, in multiple-regions, is how CDNs provide the acceleration and content-origin offloading benefits.

Due to the nature of the tasks carried out by EdgeLockers (e.g., no HTTP processing or encryption), the hardware profile typically differs from that used to support other servers. As compared to ghost servers, for example, these servers do not need much computing power, although they do require more storage space to cache the data from the multiple TLS sessions.

Figures 6, 7:
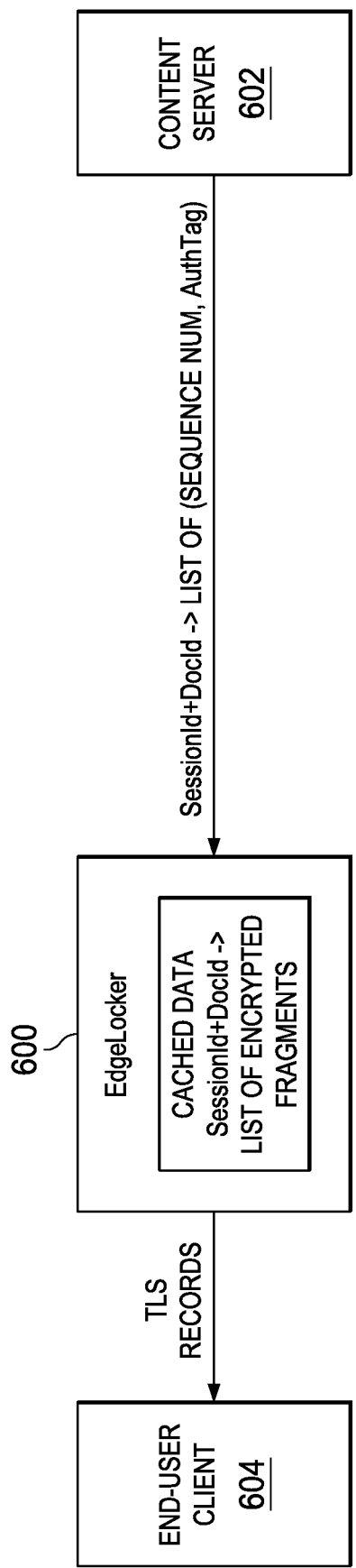
FIG. 6 depicts the EdgeLocker-ghost server interaction in more detail.
FIG. 7 depicts a TLS record for an encrypt-then-MAC operation according to this disclosure.

FIG. 6 depicts the interaction between the EdgeLocker 600 and the ghost server 602 in more detail. In general, the ghost server is considered to be upstream of the EdgeLocker. In this approach, and as depicted the outer edge (the Edge-Locker 600) is caching the encrypted fragment 605, and the inner edge (the ghost server 602) is sending the updated sequence number and the MAC (message authentication code) that results from having the updated sequence number and encrypted fragment. As noted, the EdgeLocker caches the encrypted TLS fragment. The ghost server sends an instruction to the EdgeLocker to serve the encrypted TLS fragment and, in so doing, the ghost server provides the sequence number for the fragment and the MAC needed to enable the EdgeLocker to construct the TLS response appropriately. The EdgeLocker is able to construct and serve the TLS response 607 despite having only an encrypted fragment and no session-scope secret information about the session, i.e., no keys.

FIG. 7 depicts a preferred structure for a TLS record constructed by the EdgeLocker. As can be seen, the EdgeLocker preferably implements an "encrypt-then-MAC" operation (as opposed to the MAC-then-encrypt in the RFC standard).

According to this disclosure, and as FIG. 7 illustrates, the EdgeLocker does not get any key information (e.g., the private D-H signing key, the server write key, etc.) and stores objects encrypted. Usually this would mean that the server could not send a proper TLS record because it is otherwise unable to fold the MAC inside the encryption layer. To address this, the MAC is delivered outside of the encryption (see, e.g., FIG. 7), preferably leveraging the IETF extension in RFC 7366, but in a different manner). Thus, content fragment can remain encrypted on the outer edge, and the MAC can be sent from the upstream server (e.g., ghost, the origin, etc.) at the time it is needed. The origin server typically sends an identifier for the fragment and the MAC.

Pre-population may be used for any type of server, including the on-premises box. The inner edge can also execute pre-fetch operations, and push to the outer edge. A pre-fetching approach as described in U.S. Pat. No. 8,447,837 may be used for this purpose.

The mechanism described above enables the CDN to cache content that is not currently cached at the edge, e.g., due to security reasons. It applies to content that is not changed during a session. The following section describes an extension that provides a mechanism to improve the performance of serving the secure content when it does change during a session. The notion here is to "pre-position" the content to the edge. In one embodiment, the technique is applied to changed objects that are already securely cached at the edge. In another embodiment, the approach is applied to objects that are yet to be requested, e.g., based on access patterns of the content. For example, requests to a given URL (such as a homepage) might be seen by the system to always involve fetching the homepage of the site right after the TLS session establishment. In such circumstance, the content for the homepage is pre-positioned at the edge before the HTTP request comes in so that the overall performance (using the EdgeLocker approach described) is improved. As in the caching approach, preferably a multi-layer edge network is used, with the inner edge handling the TLS termination and HTTP request handling, and the outer edge handling the data cache. In this case, content is pre-positioned in the cache to improve overall performance.

The following is the preferred workflow for the pre-positioning approach:

TLS Session Establishment and Request Processing

1. End-user client makes a request for a TLS session, either a new one or a resumed one, to the EdgeLocker.

2. The EdgeLocker checks the request packets against a set of rules to ensure the request is unlikely to be an attack. Such rules could include pre-configured firewall rules, client reputation rules, TLS session negotiation rate limiting rules, and etc.

3. If the request is valid, it is forwarded to the ghost server.

4. The ghost server goes through the TLS session negotiation process with the end-user client, with the EdgeLocker forwarding the packets. Because the EdgeLocker has no knowledge of any private keys, it does not obtain any session keys. However, the EdgeLocker could examine the packets to ensure the TLS state changes are valid to protect against attacks on the TLS negotiation process.

5. During the TLS session negotiation, the ghost server checks if the client supports encrypt-then-mac (per the RFC7366 standard), and saves it for the later HTTP request processing. If the client does not have the RFC7366-compliant support, the requests are processed in a conventional manner (as the ghost server normally would). Otherwise, the requests are processed as described in the paragraphs below.

Pre-Positioning Initial Content

1. For the objects that are designated by the content provider for initial pre-positioning, the ghost server sends the encrypted objects to the EdgeLocker, right after TLS session establishment, before the HTTP request comes in, through an auxiliary data channel (which differs from the control channel previously described).

2. The EdgeLocker stores the data from response, but without forwarding it to the end-user client.

3. The end-user client sends the HTTP request over the TLS session.

4. The EdgeLocker forwards the packets to the ghost server.

5. The ghost server processes the request and generates the TLS records of the response, but without sending them. Instead, it sends the updated information on the TLS records, which has a much smaller size than the TLS records themselves, through the control channel to the EdgeLocker.

6. The EdgeLocker uses that information, along with its cached data for the object, to construct the TLS records, and sends the TLS records to the end-user client.

Pre-Positioning Changed Content

1. Similar to pre-positioning initial content, the ghost server can also push updated objects that are cached by the EdgeLocker before the end-user client requests them.

Auxiliary Data Channel Interface Description

The ghost server pushes the pre-positioned data to EdgeLocker over the auxiliary data channel. Preferably, the interactions are initiated from the ghost server, even though the connections are established from the EdgeLocker, preferably during its start up. The reasons for this additional channel, instead of the control channel, are as follows.

1. Because the data is already encrypted, an un-encrypted channel can be used, to reduce the overhead.

2. Using a separate channel avoids possible congestion that could lead to poor performance if such data is sent over the control channel.

Preferably, the wire protocol uses Google protobuf. The format of the messages is described below.

Request Number:

Each request message includes a request number that is also included in the response, to correlate the request and response.

Cache Data Push Message:

The message from the ghost server pushing the data preferably includes the following fields:

sessionid: the id uniquely identifies the set of session keys. Note that the sessionid also captures the "version" of the bulk encryption keys, in addition to the TLS session identifier.

docid: an id uniquely identifies the HTTP object being served. Note that the docid also captures the "version" of the object.

recs: list of TLS records.

In response, the message from the EdgeLocker preferably includes the following fields:

ack: 1 for success or the error code otherwise.

The EdgeLocker message protocol includes the session identifier to address the situation when there is a session resumption; in this case, the ghost server needs to be able to tell the Edge Locker which version of the encrypted fragment to serve (i.e., to serve the version that is encrypted with the current session keys in the session, not the prior ones).

Thus, in the pre-positioning (or pre-population) approach, a request for a first object is received at the upstream second server. The request is delivered to the upstream second server by a first server. The second server is assumed in this example to have previously provided to the first server one or more second objects required by (or associated with) the first object. Objects are stored in the first server as encrypted TLS fragments. As required, the second server sends instruction(s) to the first server to serve the encrypted TLS fragments for both the first object and the one or more second objects that have been pre-positioned in the first server in accordance with the disclosure.

TLS as implemented herein typically is TLS 1.2, and the particular cipher suite used in TLS is not a limitation. The approach may be used with advanced cipher suites, such as GCM AEAD ciphers. The references to TLS (or particular cipher suites therein) are merely exemplary. The techniques described herein may be generalized for use with any cryptographic protocol that uses both (i) asymmetric cryptography to exchange unidirectional symmetric keys, and (ii) separate authentication code keys. Thus, the techniques may be used for various SSL versions, next-generation TLS, and other such protocols.

The reference to HTTP-based requests and responses is merely exemplary as well.

The techniques described above are not limited to the intermediary being an edge server within an overlay network; thus, the above methods should be generalized with respect to any third party entity (system, device, machine, program, process, execution thread, etc.) and not just the CDN edge server as described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP and HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server. There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Because the EdgeLocker does not have access to any keys, and because data stored therein is encrypted, an EdgeLocker needs support of some other content server. A by-product of this approach is that cached data is only valid for a given TLS session.

What is claimed is as follows:

1. A method of secure content delivery within an overlay network having a set of cache servers, comprising:
associating a first cache server of the set of cache servers with a first security model; associating a second cache server of the set of cache servers with a second security model, the first security model having less tolerance of key exposure as compared to the second security model;
caching a content object at the first cache server only in an encrypted form, the content object being published at an origin server that is distinct from the set of cache servers of the overlay network;
caching one or more additional content objects at the first cache server, the one or more additional content objects being associated with the content object and being pre-positioned at the first cache server based on a determination that a request for service of the content object is anticipated to be followed by one or more requests for the additional content objects;
during an attempt to establish a TLS session with a requesting client, determining whether the requesting client supports authenticated encryption;
responsive to a determination that the requesting client supports authenticated encryption, and following establishment of the TLS session, receiving a request for the content object at the first cache server from the requesting client;
forwarding the request for the content object from the first cache server to the second cache server;
receiving a response from the second cache server, the response having been generated at the second cache server following termination there of the TLS session, the response including an instruction to serve the content object from the first cache server, together with information for use in constructing one or more TLS records at the first cache server;
constructing the one or more TLS records at the first cache server using the information received from the second cache server and without access at the first cache server to a session key; and
sending the constructed TLS records from the first cache server to the requesting client.

2. The method as described in claim 1 wherein the information comprises a sequence number, and a message authentication code (MAC).

3. The method as described in claim 2 wherein sending the constructed TLS records from the first cache server to the requesting client includes sending the MAC received from the second cache server.

4. The method as described in claim 3 wherein a constructed TLS record includes the MAC outside of encrypted cipher text.

5. The method as described in claim 1 wherein the first cache server constructs the one or more TLS records using one or more encrypted fragments associated with the content object and without session-specific information about the session.

6. The method as described in claim 1 wherein the first cache server is positioned at an outer edge of the overlay network, and the second cache server is positioned upstream of the first cache server at an inner edge of the overlay network.

7. The method as described in claim 1 wherein the first cache server does not perform HTTP request processing.

8. The method as described in claim 1 further including maintaining a persistent secure connection between the first cache server and the second cache server, the persistent secure connection being used to communicate the information.

9. The method as described in claim 1 wherein the overlay network is a content delivery network.

10. The method as described in claim 1 further including maintaining a secure content channel between the first cache server and the second cache server, the secure content channel being used to communicate the one or more additional content objects.

11. The method as described in claim 1 wherein the authenticated encryption support is an encrypt-then-mac function.

* * * * *